Oct. 21, 1930.  W. S. WILLIAMS ET AL  1,778,743
METHOD AND APPARATUS FOR MANUFACTURING GLASSWARE
Filed Nov. 23, 1927   3 Sheets-Sheet 1
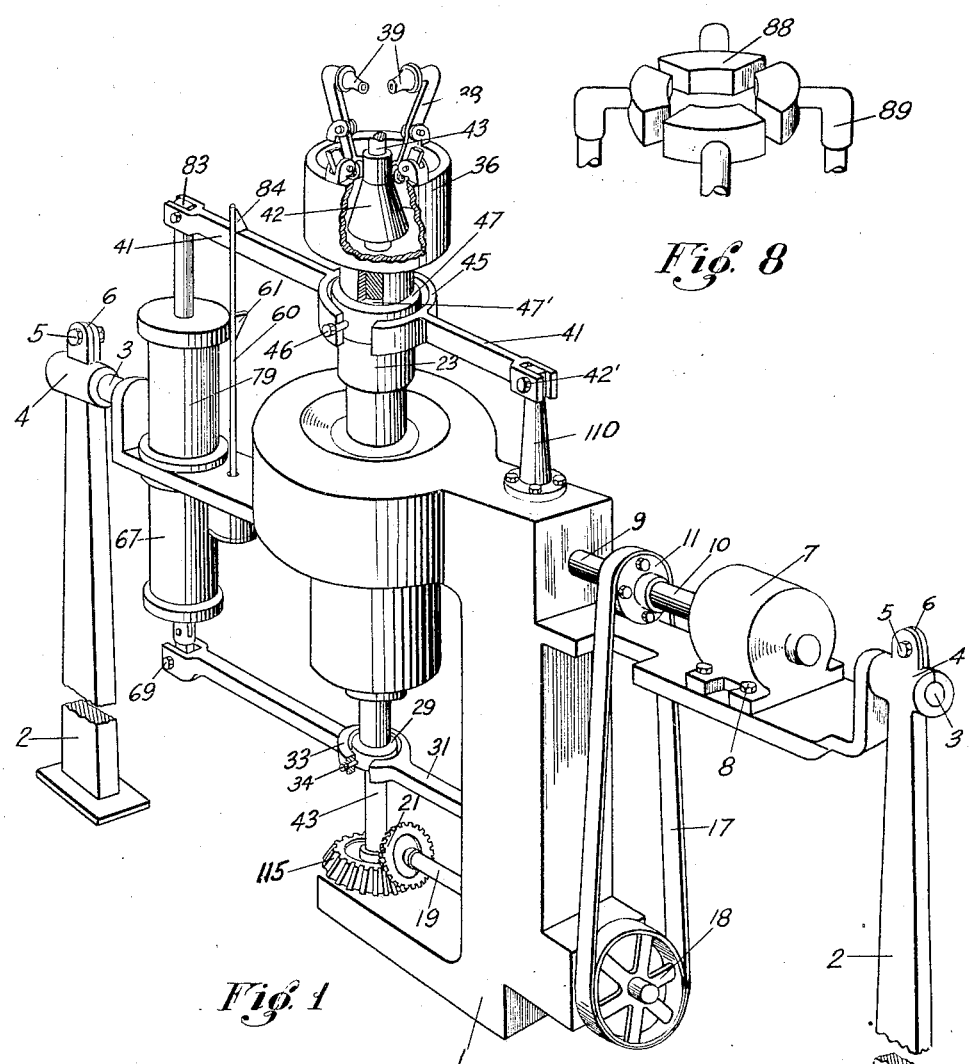
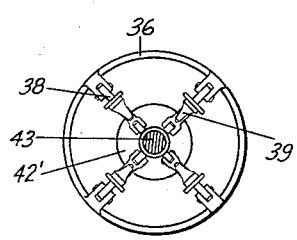
INVENTOR.
Wilbert S. Williams.
David L. Middendorf
BY
ATTORNEY.

Oct. 21, 1930.  W. S. WILLIAMS ET AL  1,778,743
METHOD AND APPARATUS FOR MANUFACTURING GLASSWARE
Filed Nov. 23, 1927  3 Sheets-Sheet 3

INVENTOR.
Wilbert S. Williams.
David L. Middendorf.
BY
ATTORNEYS.

Patented Oct. 21, 1930

1,778,743

UNITED STATES PATENT OFFICE

WILBERT S. WILLIAMS AND DAVID L. MIDDENDORF, OF COLUMBUS, OHIO, ASSIGNORS TO THE FEDERAL GLASS COMPANY, OF COLUMBUS, OHIO, A CORPORATION OF OHIO

METHOD AND APPARATUS FOR MANUFACTURING GLASSWARE

Application filed November 23, 1927. Serial No. 235,377.

Our invention relates to method and apparatus for manufacturing glassware and, more particularly, to method and apparatus for the manufacture of stemmed and footed articles of glassware, such as goblets and the like.

Heretofore, it has been undesirable to manufacture thin-walled glassware, such as goblets or the like, by the well-known pressing method. Goblets or similar glass articles manufactured by the pressing method have walls that are necessarily thick and lacking in clearness and brilliancy. Therefore, the quality of pressed glassware is lower than is satisfactory for the uses to which thin-walled glass articles are ordinarily put.

One difficulty in making glassware by hand resides in the fact that while such glassware is usually sufficiently high grade, the rate of production is so slow as to make the articles very expensive. Another difficulty encountered in making such glass articles by the hand method is that the different steps to be performed by different operators, whose degree of skill is seldom if ever the same, are so co-related that, if any one of said operators fail to perform his particular operation properly, the result to be obtained is defeated.

The primary object of our invention is to provide a method and apparatus for manufacturing thin-walled glassware, such as goblets or the like, by mechanical means wherein the result obtained is more uniform than that obtained when the articles are made by the hand method.

Another object of our invention is to provide a method and apparatus for shaping thin-walled articles of glassware, such as goblets or the like, wherein means are provided for forming both the stem and the foot integrally with the bowl.

To shape thin-walled glassware, such as goblets or the like in accordance with our method and with our apparatus, a mass of glass is first partially shaped in a press mold in such a manner that the bottom of the partially shaped mass will be of unusual thickness. A holding device that forms a part of some suitable transfer mechanism then grasps the top of the partially shaped mass and carries it to a heating chamber. The holding device is preferably rotatable and is so constructed as to maintain the shape of the top of the articles until the final finished shape of the article is completed. Such holding device is provided with means for blowing the bowl of the goblet to its desired finished shape.

The transfer mechanism is so arranged that the partially shaped mass will be carried from the heating chamber into concentric relation with a stem and foot-forming means. Such stem and foot-forming means comprises rollers that are movable into cooperative relation with the bottom of the partially shaped mass and the construction of the operating mechanism for the rollers is such that they will move downwardly in a generally vertical path, at the same time describing a gradually decreasing circle. At their lowermost point, the rollers ride over the remaining glass, that is left after completion of the stem, to form a foot. The article is then transferred to a suitable blow mold and blown to the desired finished shape.

After the stem and foot are formed, the rollers are permitted to swing outwardly away from the completed stem and foot and means are provided for raising the rollers vertically upward to grasp the bottom of a succeeding partially shaped mass.

The preferred embodiment of our invention is shown in the accompanying drawings wherein similar characters of reference designate corresponding parts and wherein:

Figure 1 is a perspective view, with parts broken away, showing the preferred embodiment of our invention.

Figure 7 is a top plan view of the structure that is adapted to form the stem and foot of the goblet.

Figure 8 is a perspective view of a modified form of structure for forming the stem and foot.

Figure 2:
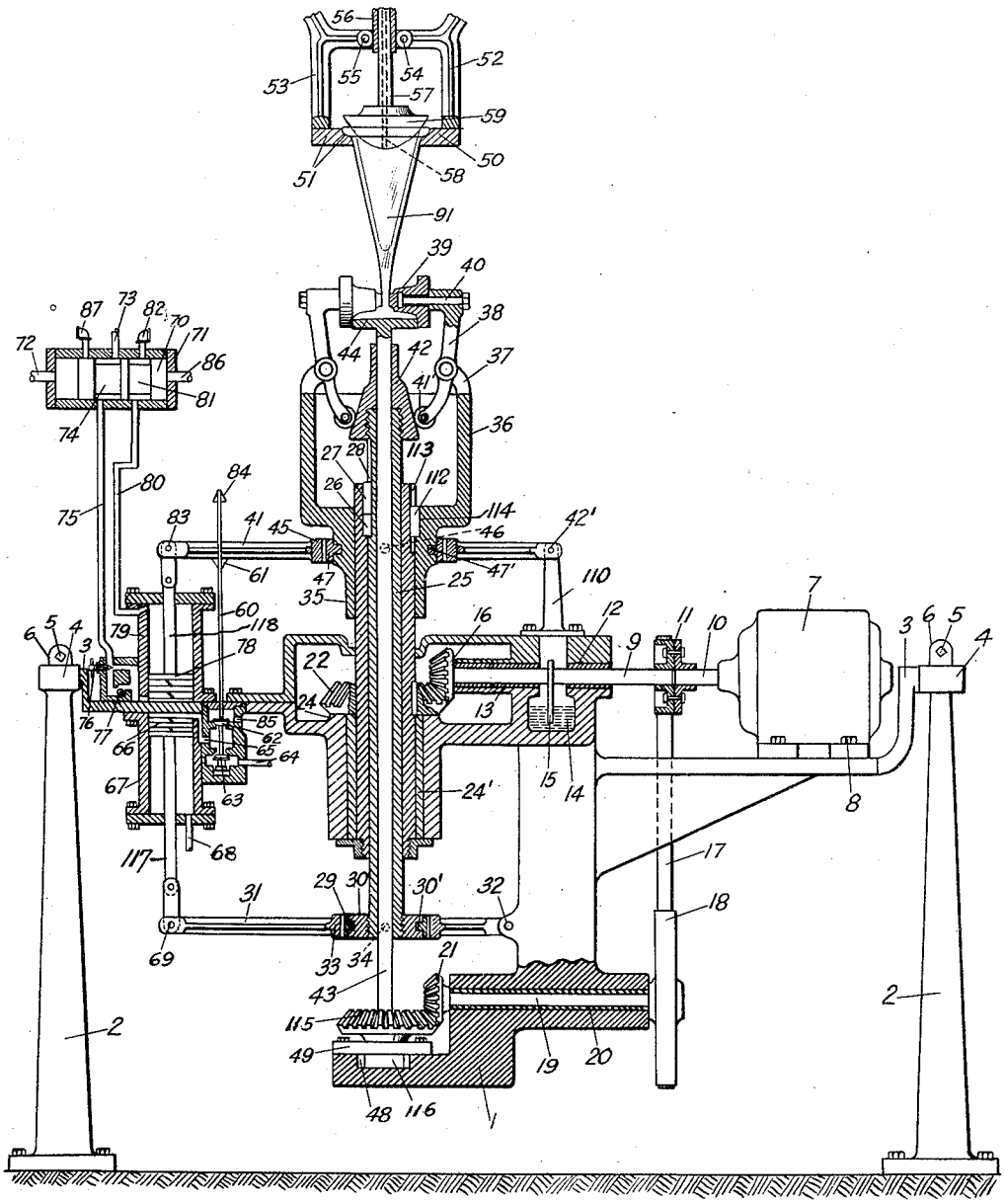
Figure 2 is a vertical sectional view of the device shown in Figure 1.

With reference to Figures 1 and 2 of the drawings, we have shown the preferred embodiment of our apparatus as consisting of a machine support 1 mounted between upright posts 2. The connection between the machine support and the upright posts is preferably similar to the connections shown in the drawings wherein trunnions 3 on the machine supports are held in the split collars 4 that are carried by the upright posts 2. Bolts 5 which extend through ears 6 on the split collars provide a means for tightening or loosening the split collars about the trunnions 3. Such construction is provided in order that the machine support and the mechanism mounted thereon may be rotatably adjusted to a position of proper vertical alignment with respect to the glass holding device of a suitable transfer mechanism, which holding device will hereinafter be described in detail.

A motor 7 is mounted on and rigidly held to the machine support 1 by means of the bolts 8, and a drive shaft 9 is rigidly connected to the motor shaft 10 by means of a coupling 11. The drive shaft 9 is supported by and rotates in bearings 12 and 13, Figure 2, which bearings are lubricated by means of an oil cellar 14, disposed between these bearings, and a ring 15 that is loosely mounted on the shaft 9. The drive shaft 9 also has a bevel gear 16 mounted upon the extreme outer end thereof.

A belt 17 connects the coupling 11, which preferably takes the form of a belt pulley, with a pulley wheel 18 that is rigidly mounted upon one end of a shaft 19. This shaft 19 is supported by and rotates in a bearing 20 which may be lubricated by any well-known means. Such shaft has a bevel gear 21 meshing with the level gear 115 rigidly attached to the end that is opposite the end to which the pulley wheel 18 is attached. It will be understood that other means of forming a driving connection between the shafts 9 and 19, respectively, may be used if desired.

This pulley arrangement will allow the gear 115 to be driven at a much less speed than the gear 22, although both are driven from the same source. The reason for this variance in speed of rotation will be hereinafter referred to.

The bevel gear 16 meshes with a bevel gear 22 that is keyed or otherwise rigidly attached to a hollow shaft 23. This bevel gear rotates in a bearing 24 and the hollow shaft 23 rotates in a bushing 24' in the machine support 1. A hollow shaft 25 is mounted within the hollow shaft 23 and is reciprocable with relation thereto but the respective shafts are prevented from relative rotation by means of a spline key 26 that fits in complemental keyways 27 and 28 in the respective shafts.

The hollow shaft 25 is reciprocable by air under pressure that operates mechanism consisting of a collar 30 that is threaded or otherwise rigidly attached to the lower end of the hollow shaft 25 and rotatable therewith, as shown in Figure 2. As also shown in this figure, a stationary collar 29 is superimposed on the collar 30 and has an annular flange 30' which fits within an annular groove in the collar 30. Oppositely disposed on this collar 29 are two pivot pins 34, one of which is shown in Figure 1. These pivot pins are journaled at their outer ends in an angular enlargement 33 formed integrally with and as a part of the lever 31. This lever is pivoted at one end to the machine support 1, as at 32, and at the other end to a connecting rod 117, as at 69.

The structure is such that the hollow shaft 25 may be moved up and down without affecting the rotation thereof. When the lever 31 is lifted, the shaft 25 is moved vertically through the medium of the pins 34, but the tongue and groove arrangement between the collar 30 and the superimposed collar 29 is such that the hollow shaft 25 and collar 30 may be rotated while the superimposed collar 29 remains stationary, that is, with regard to rotative movement. The means for moving the lever 31 will be hereinafter described in detail.

Mounted on the outside of the hollow shaft 23 and reciprocable with relation thereto is the hollow shaft 35. This hollow shaft 35 has an enlarged circular portion 36, on the top of which are mounted the ears 37. The hollow shaft 35 is prevented from relative rotation with relation to the hollow shaft 23 by means of a spline key 112 which fits within complemental keyways 113 and 114 in the respective shafts.

Reciprocation of the hollow shaft 35 is accomplished by air under pressure that serves to operate mechanism consisting of a lever 41 that is pivoted as at 42' to a standard 110 mounted on the machine support. Such lever 41 has an annular portion 45 that is connected by means of pivot pins 46 with a stationary collar 47 having an annular flange 47' cooperating with an annular groove in the shaft 35. This structure is similar to that for giving up and down movement to the shaft 25; it is for the purpose of imparting vertical movement to the shaft 35 during the rotation thereof. The means for moving the lever 41 will, also, be hereinafter described in detail.

Pivotally mounted on each of the ears 37 is an arm 38. These arms preferably take the form of lever arms and may be of any number, although in the structure shown in Figure 7, four of these arms are used. A roller 39 is mounted upon the upper end of each arm by means of a bolt 40 which is of such form as to serve as a thrust bearing for the roller. The rollers are so mounted that they are idly rotatable in a substantially horizontal plane. Furthermore, each roller tapers toward its outer end and is equipped with a flange 39', Figure 6, adjacent the inner end thereof. On the lower end of each of the arms 38 is a roller 41' which acts as a bearing for contacting with a cone-shaped structure 42 that is threaded or otherwise rigidly attached to the upper end of the hollow shaft 25.

A rod or shaft 43 that is preferably solid passes through the center of the hollow shaft 25 in the manner shown in Figure 2. As shown in this figure, a portion 44 having an upper surface that conforms to the shape of the under side of a goblet foot is disposed on the upper end of the rod or shaft 43 and preferably forms an integral part thereof. A bevel gear 115 is rigidly attached to the lower end of the rod or shaft 43 in such a position as to mesh with the bevel gear 21. The rod or shaft 43 extends below the bevel gear 45 and is provided with a thrust bearing 116 on its extreme lower end, which thrust bearing is disposed in a bearing groove 48 in the machine support 1 and is covered by a plate 49.

Figure 4:
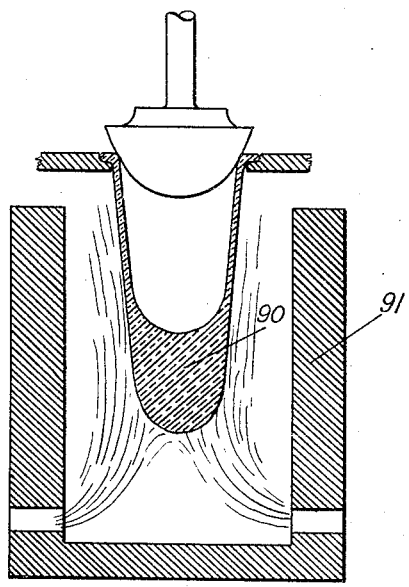
Figure 4 is a vertical sectional view of the means for heating the partially shaped mass.

The holding device that forms a part of some suitable transfer mechanism consists of jaw portions 50 and 51 which are mounted on the ends of the arms 52 and 53 which are, in turn, pivoted as at 54 and 55 to a hollow shaft 56. Mounted within the hollow shaft 56 and reciprocable with relation thereto is the shaft 57, which preferably has an opening 58 through the center thereof and has the portion 59 rigidly attached to its lower end. The portion 59 is preferably formed with a convex surface, as shown in Figures 2 and 4 and the entire holding device is preferably adapted to be rotated by some suitable means.

The movements of our device, which are controlled by air under pressure, will now be described in detail. As shown in Figure 2 of the drawings, the various parts of the device are in a position such as they will have assumed on completing a blank. At this time, the lever 41 has moved downwardly and moved the stem 60, by reason of its contact with the stop 61, to close the valve 62 and open the valve 63. With the valves 62 and 63 in such respective positions, constant air under pressure will flow through the pipe 64, past the valve 63 and through the opening 65 against the upper surface of the piston 66 which is disposed in the cylinder housing 67. Constant air under pressure flowing between the upper larger surface of the piston 66 and the complemental surface of the cylinder housing 67 will move the piston downwardly by overcoming the air pressure between the smaller surface of the piston and the complemental surface of the cylinder housing and forcing this air under pressure back into the constant air line 68. The piston 66 is pivotally connected at 69 to the lever 31 by means of the piston rod 117 and downward movement of the piston 66 will move the hollow shaft 25 downwardly, with the resultant downward movement of the cone-shaped portion 42. It will be understood that the motor 7 is operating to rotate the rod or shaft 43 and the hollow shafts 23, 25 and 35 through the mechanism hereinbefore described and it will be clear that on the cone-shaped portion 42 being moved downwardly, the rollers 39 will fly outwardly through the action of centrifugal force. The shafts 23, 25 and 35 will continue to rotate in unison, owing to the fact that they are all keyed together, but owing to the vertical keys 27 and 112, they are capable of independent vertical movement during that period when they are being rotated in unison.

On the cone-shaped portion 42 reaching the limit of its downward movement, the cylinder 70 in the main table-operating valve 71 will have been moved to the right under the influence of a puff of air through the pipe 72, whereupon constant air under pressure will flow through the pipe 73 through the annular groove 74 in the cylinder 70, through the pipe 75 and past the needle valve 76 and the ball check valve 77 to the larger under surface of the piston 78 disposed in the housing 79 to move this piston upwardly. The air pressure above the piston 78 will exhaust through the pipe 80, through the annular groove 81 in the cylinder of the main table-operating valve and through the vent 82 to the atmosphere.

The piston 78 is pivotally connected to the lever 41 at 83 through the medium of a piston rod 118 and upward movement of the piston will move the hollow shaft 35 upwardly for a reason to be hereinafter explained. The lever 41 on moving upwardly contacts with the stop 84 on the stem 60 and moves the stem upwardly to open the valve 62 and close the valve 63. With the valves 62 and 63 in these respective positions, the air under pressure between the upper larger surface of the piston 66 and the cylinder housing 67 will exhaust through the opening 65, past the valve 62 and through the vent 85 to the atmosphere whereupon constant air under pressure flowing through the constant air pipe 68 and against the under smaller surface of the piston will move it upwardly. Upward movement of the piston 68 will move the cone-shaped portion 42 upwardly through the medium of the mechanism hereinbefore described to the position shown in Figure 2.

At this time the cylinder 70 and the main table-operating valve 71 will be moved to the left under the influence of a puff of air through the pipe 86 whereupon constant air under pressure will flow through the pipe 73, through the annular groove 81 in the cylinder 70, and through the pipe 80 to the upper smaller surface of the piston 78. The air under pressure beneath the piston 78 will exhaust past the needle valve 76, through the pipe 75, through the annular groove 74 in the cylinder 70 and through the vent 87 to the atmosphere. In order to control the downward movement of the piston 78, we have so placed the ball check valve 77 that the exhausting air will move the ball check valve to close one avenue of escape whereby all of the exhausting air will be forced past the needle valve 76. By opening or closing the needle valve, the rate of exhaust of air from beneath the piston 78 may be controlled and, consequently, the rate of the downward movement of the piston may be regulated.

Downward movement of the piston 78 will move the hollow shaft 35 downwardly and the rollers 41' contacting with the surface of the cone-shaped portion 42 will gradually draw the rollers 39 closer together.

With reference to Figure 8 of the drawings, we have shown a modification of our stem and foot-forming means which consists of segments of a perfect circle which may be designated by the numeral 88. Each segment is rigidly attached to or forms an integral part of a lever arm 89 which may be substituted for the lever arm 38. The operation of this device is very similar to the operation of the stem and foot-forming device hereinbefore described, the only difference being that the segments 88 are not rotatable with relation to the lever arms 89.

Figure 3:
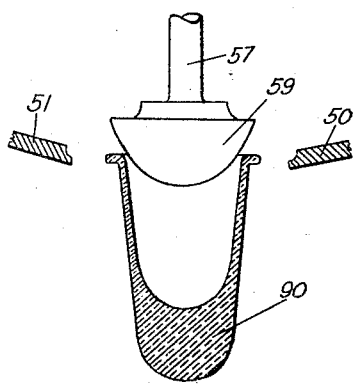
Figure 3 is a side view, partly in section, showing the partially shaped mass and the gripping portion of a transfer device about to take hold thereof.
Figure 5:
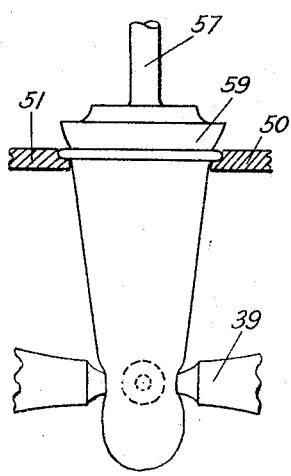
Figure 5 is a side view showing the partially shaped mass being held by the gripping device with the stem and foot-forming means starting to operate upon the mass.

In the operation of our device, a partially shaped mass of glass 90 that may be shaped in a press mold or by any other well-known means, is grasped by the holding device of the transfer mechanism in the manner shown in Figures 3, 4 and 5. It will be understood that any type of transfer mechanism may be used. The partially shaped mass of glass 90 is carried by the transfer mechanism to and through a heating chamber 91 wherein a flame or heat is caused to play about the bottom of the partially shaped mass which is purposely made of unusual thickness. The transfer mechanism rotates slowly during the heating period so that the heat will be uniformly distributed throughout the blank.

As shown in Figure 4 of the drawings, the partially shaped mass of glass on being heated will stretch downwardly under its own weight. After the partially shaped mass of glass has become sufficiently heated and stretched sufficiently, it is transferred to a position immediately above the stem and foot-forming means hereinbefore described, and is rotated, by the holding means, or transfer mechanism, at the same speed of rotation as the shaft 43 and the portion 44 thereof. The foot of the blank 91 is adapted to rest on the portion 44 when it is drawn into cooperation therewith by the rollers 39.

When the partially shaped mass of glass reaches a position immediately above the stem and foot-forming means, such stem and foot-forming means is in its raised position with the rollers 39 thereof spread outwardly and the rollers 41' contacting with the upper smaller part of the cone-shaped portion 42. At this time the device operates in the following manner:

As previously stated, a motor 7 rotates the hollow shafts 23, 25 and 35 at the same rate of speed, they being splined together as hereinbefore described, and the same motor rotates the shaft 43, which is stationary as regards vertical movement. The reason for the shafts 23, 25 and 35 rotating at the same rate of speed and being vertically movable with relation to each other and the reason for the shaft 43 being rotatable but not movable vertically will later be apparent.

At this time, the rotating hollow shaft 35 is caused to move downwardly by reason of the downward movement of the piston 78 whereupon the rollers 41' contacting with the outer surface of the cone-shaped portion 42 will cause the rollers 39 to move inwardly as they move downwardly. The cone-shaped portion 42 rotates at the same rate of speed as the hollow shaft 35 to prevent stress on the lever arms 38, resulting from friction between the rollers 41' and the cone-shaped portion. Such inward movement of the rollers 39 will cause them to grasp the bottom of the partially-shaped mass of glass 90 in the manner shown in Figure 5. As will be apparent, these rollers 39 will continue to move inwardly while moving downwardly until a stem and a foot is formed from the partially-shaped mass, as shown in Figures 2 and 6.

The foot is formed by cooperative action between the rollers 39 and the portion 44 whose upper surface conforms to the shape of the under surface of a goblet foot. Collars 39' on the rollers 39 engage the outer edge of the portion 44 before the foot is filled out. Such construction provides a means for taking care of any slight variation in the amount of glass that remains after the glass has been stretched downwardly to form the stem. The portion 44 preferably rotates at the same rate of speed as the holding device of the transfer mechanism, which prevents twisting of the glass being shaped. As hereinbefore mentioned, the gear 115 is driven at a reduced speed with relation to the speed of rotation of the shaft 36. The reason for this is apparent in that the glass blank 91 will be rotated at a low speed and the rollers 40 will be driven at a higher speed thus causing them to traverse the foot of the blank, although both the glass blank 91 and the rollers are being rotated in the same direction.

Figure 6:
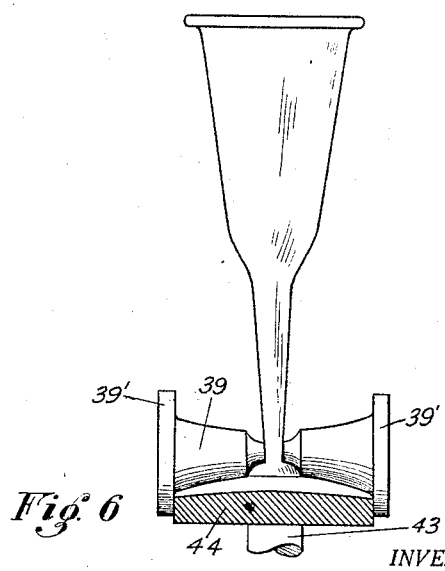
Figure 6 is a side view showing the rollers in the position of forming the foot.

On the stem and foot of the article being completely formed, as shown in Figures 2 and 6, downward movement of the piston 66 will cause the cone-shaped portion 42 to move downwardly whereupon the rollers 39 may fly outwardly under the influence of centrifugal force until the rollers 41′ contact with the upper smaller portion of the cone-shaped portion 42. The glass blank 91 shown in Figures 2 and 6 may then be removed from the stem and foot-forming means.

The hollow shaft 35 will now move upwardly by reason of the upward movement of the piston 78 and the cone-shaped portion 42 will move upwardly the same distance by reason of the upward movement of the piston 66 whereupon the cycle of operation hereinbefore described will be repeated.

After the entire blank has been formed it may be transferred, while still in the holding device, to a suitable blow mold whereupon air under pressure may be caused to flow through the pipe 58 to blow the bowl of the blank to the desired finished shape. At this time the usual finishing operations may take place.

With reference to the drawings and the preceding description, it will be apparent that we have provided a method and apparatus for shaping thin-walled glassware which, while done by mechanical means, will produce glassware of a quality that is equal to hand-blown ware and at the same time will produce a greater degree of uniformity throughout a large number of articles.

Having thus described our invention, what we claim is:

1. The method of producing stemmed and footed glassware which comprises pressing a blank with an abnormally heavy end, and then drawing such end downwardly and outwardly by mechanical means into and against an open foot mold.

2. The method of producing stemmed and footed glassware which comprises pressing a blank with an abnormally heavy end, bringing shaping rollers into contact with such end, and causing relative longitudinal movement between said rollers and the support for said blank and relative rotation between such end and said shaping rollers to shape such end.

3. The method of producing stemmed and footed glassware which comprises pressing a blank with an abnormally heavy end, bringing shaping rollers into contact with such end, and causing relative longitudinal movement between said rollers and the support for said blank and relative rotation between such end and said shaping rollers to shape such end and force its extremity into a foot mold and then continuing the operation of said rollers in cooperative relation to said foot mold to produce a foot.

4. The method of producing stemmed and footed glassware which comprises pressing a blank with an abnormally heavy end, bringing shaping rollers into contact with such end, and causing relative longitudinal movement between said rollers and the support for said blank and relative rotation between such end and said shaping rollers to shape such end and force its extremity into a foot mold and then continuing the operation of said rollers in cooperative relation to said foot mold to produce a foot, and then blowing the blank.

5. The method of producing stemmed and footed glassware which comprises pressing a blank with an abnormally heavy end, heating such end, bringing shaping rollers into contact with such end, and causing relative longitudinal movement between said rollers and the support for said blank and relative rotation between such end and said shaping rollers to shape such end and force its extremity into a foot mold and then continuing the operation of said rollers in cooperative relation to said foot mold to produce a foot, and then blowing the blank.

6. The method of producing stemmed and footed glassware which comprises pressing a blank with an abnormally heavy end, applying surrounding rollers to said abnormally heavy end and moving said rollers inwardly and downwardly and in a rotary path relative to said end to shape it.

7. Apparatus for shaping the lower ends of blanks comprising converging members and means for causing relative longitudinal movement between said members and the support for said blank and relative rotation between said members and such lower ends.

8. Apparatus for shaping the lower ends of blanks comprising converging members, means for causing relative longitudinal movement between said members and the support for said blank and relative rotation between said members and such lower ends, and means for moving said converging members inwardly as said relative longitudinal movement progresses.

9. The method of manufacturing stemmed and footed glassware which comprises partially shaping a mass of glass by pressing, stretching said partially shaped mass of glass and simultaneously forming a stem thereon and then blowing a bowl from said mass.

10. The method of manufacturing stemmed and footed glassware which comprises partially shaping a mass of glass by pressing, stretching said partially shaped mass of glass and simultaneously forming a stem thereon, forming a foot on said stem by mechanical means and then blowing a bowl from said mass.

11. The method of manufacturing stemmed and footed glassware which comprises forming a bowl blank by pressing, stretching said blank to form a stem and forming a foot integral with said stem and blowing a bowl.

12. The method of manufacturing stemmed and footed glassware which comprises forming a blank by pressing and then stretching to form a stem, forming a foot integral with said stem and then blowing to shape the bowl of said blank.

13. Apparatus for manufacturing high quality, thin-walled glassware such as goblets or the like comprising means for supporting a partially shaped mass of glass which embodies hinged sections adapted to open and close about the mass of glass, said means being adapted to be rotated and means for holding the mass of glass against movement with relation to said sections, said means taking the form of a disc having a convex surface.

14. Apparatus for manufacturing high quality, thin-walled glassware such as goblets or the like comprising means for supporting a partially shaped mass of glass which embodies hinged sections adapted to open and close about the mass of glass, said means adapted to be rotated and means for holding the mass of glass against movement with relation to said sections, said means taking the form of a vertically movable disc having an oval face.

15. Apparatus for manufacturing stemmed and footed glassware comprising means adapted to be rotated for supporting a partially shaped mass of glass, means for forming a stem and a foot from said mass and means for maintaining a portion of said mass in its partially shaped condition while said stem and foot are being formed.

In testimony whereof we hereto affix our signatures.

WILBERT S. WILLIAMS.
DAVID L. MIDDENDORF.